United States Patent [19]
Khalid et al.

[11] Patent Number: 5,375,412
[45] Date of Patent: Dec. 27, 1994

[54] ROTATING STALL RECOVERY

[75] Inventors: Syed J. Khalid, Palm Beach Gardens, Fla.; James V. French, Huntsville, Ala.

[73] Assignee: United Technologies Corporation, Hartford, Conn.

[21] Appl. No.: 51,921

[22] Filed: Apr. 26, 1993

[51] Int. Cl.$^5$ .............................................. F02C 9/16
[52] U.S. Cl. .................................... 60/39.29; 415/27
[58] Field of Search ........................... 60/39.27, 39.29; 415/26, 27, 28, 33, 36, 49

[56] References Cited

U.S. PATENT DOCUMENTS

| | | | |
|---|---|---|---|
| 2,741,423 | 4/1956 | Lombard | 415/27 |
| 4,060,979 | 12/1977 | Elsaesser et al. | 60/39.29 |
| 4,060,980 | 12/1977 | Elsaesser et al. | 60/39.29 |
| 4,117,668 | 10/1978 | Elsaesser et al. | 60/39.29 |
| 5,042,245 | 8/1991 | Zickwolf | 60/39.29 |
| 5,117,625 | 6/1992 | McArthur et al. | 60/39.29 |

Primary Examiner—Louis J. Casaregola
Attorney, Agent, or Firm—Robert E. Greenstien

[57] ABSTRACT

In an aircraft gas turbine engine, stator vane deflection and compressor bleed are controlled to alter the compressor airflow vs. compressor pressure relationship map when stall conditions are detected based on compressor speed and compressor temperature, a change that means that less change in pressure required to nudge the compressor from of a stall, accelerating stall recovery. Once the stall has ceased, the stator deflection and bleed are restored to pre-recovery values.

6 Claims, 4 Drawing Sheets

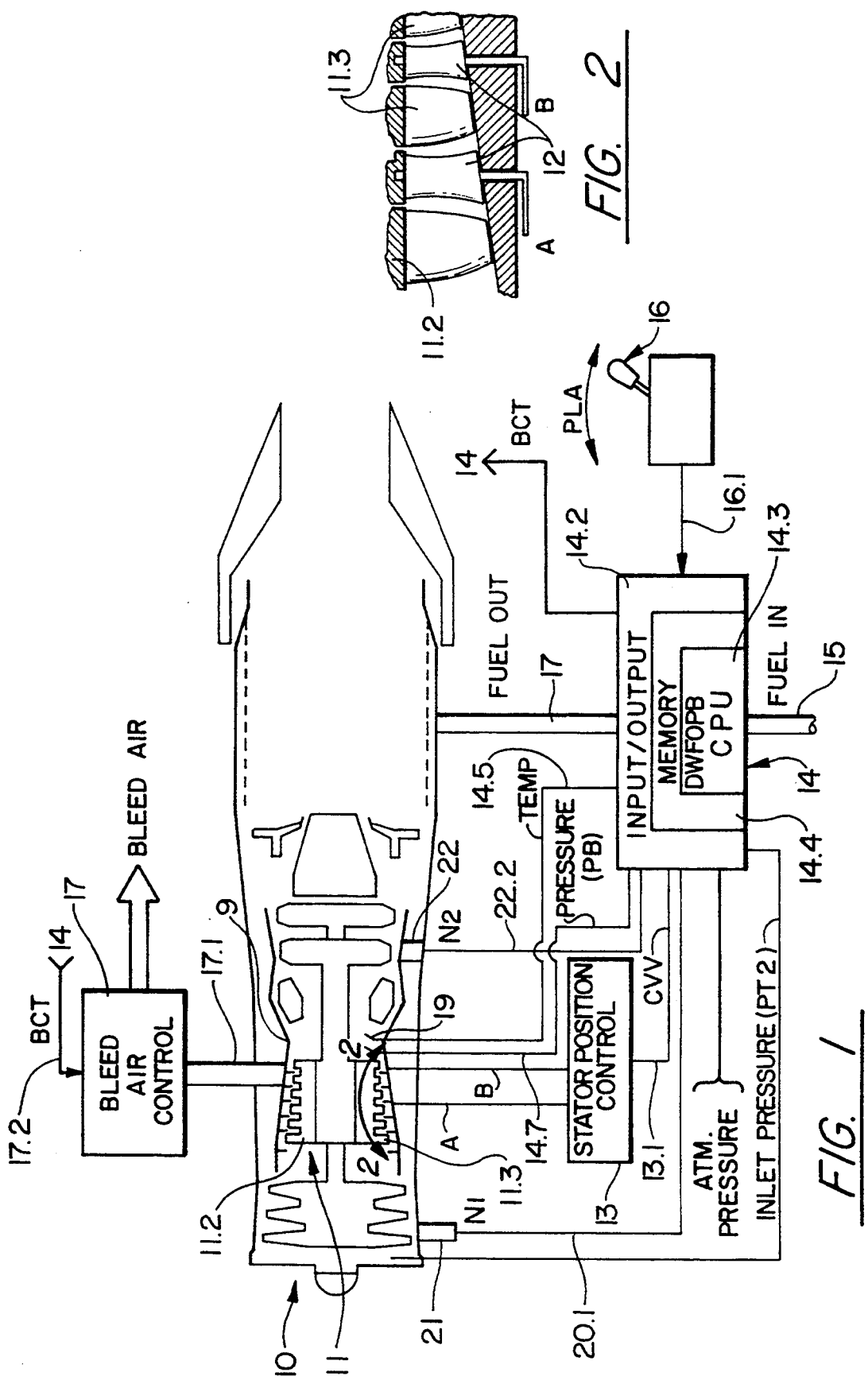

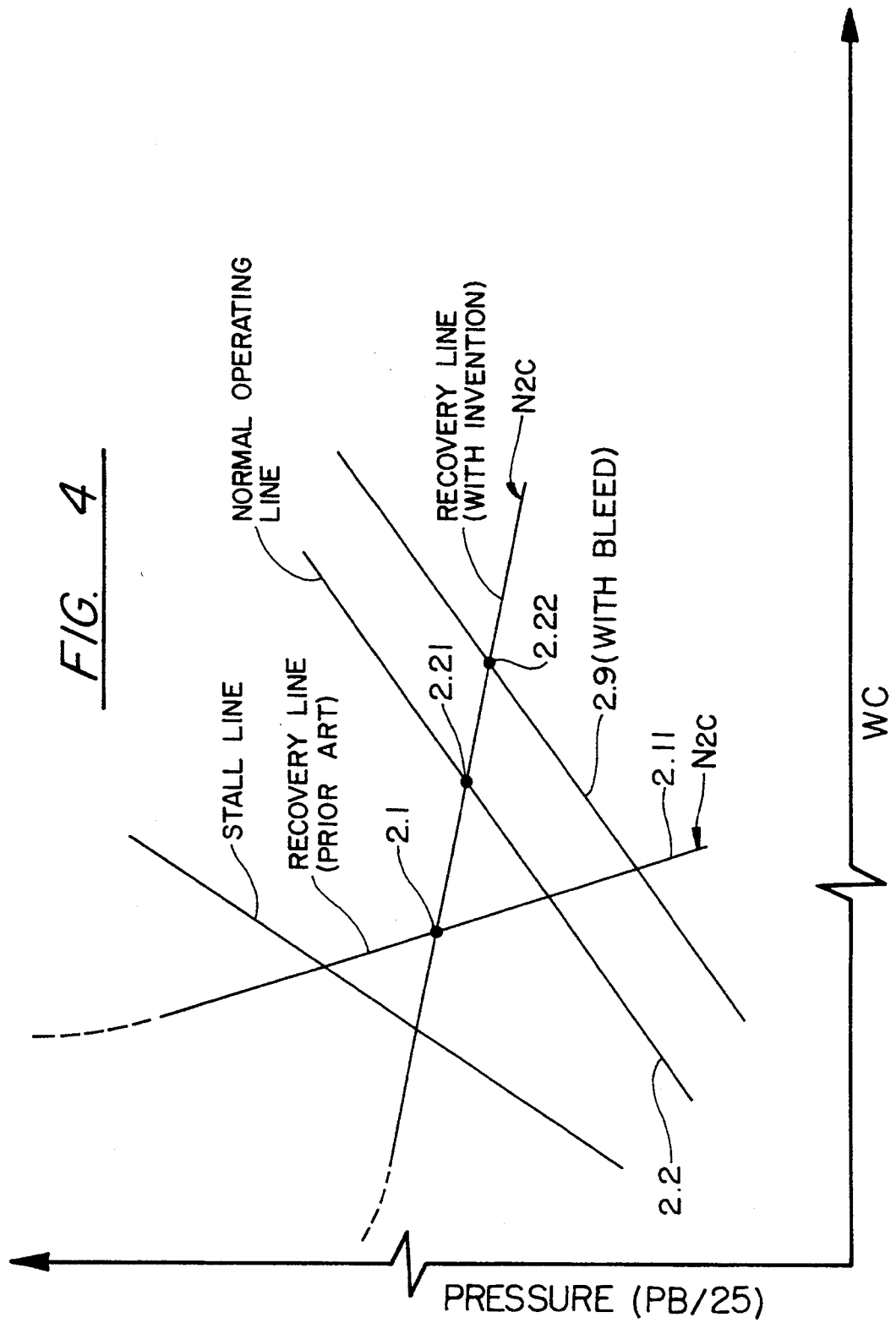

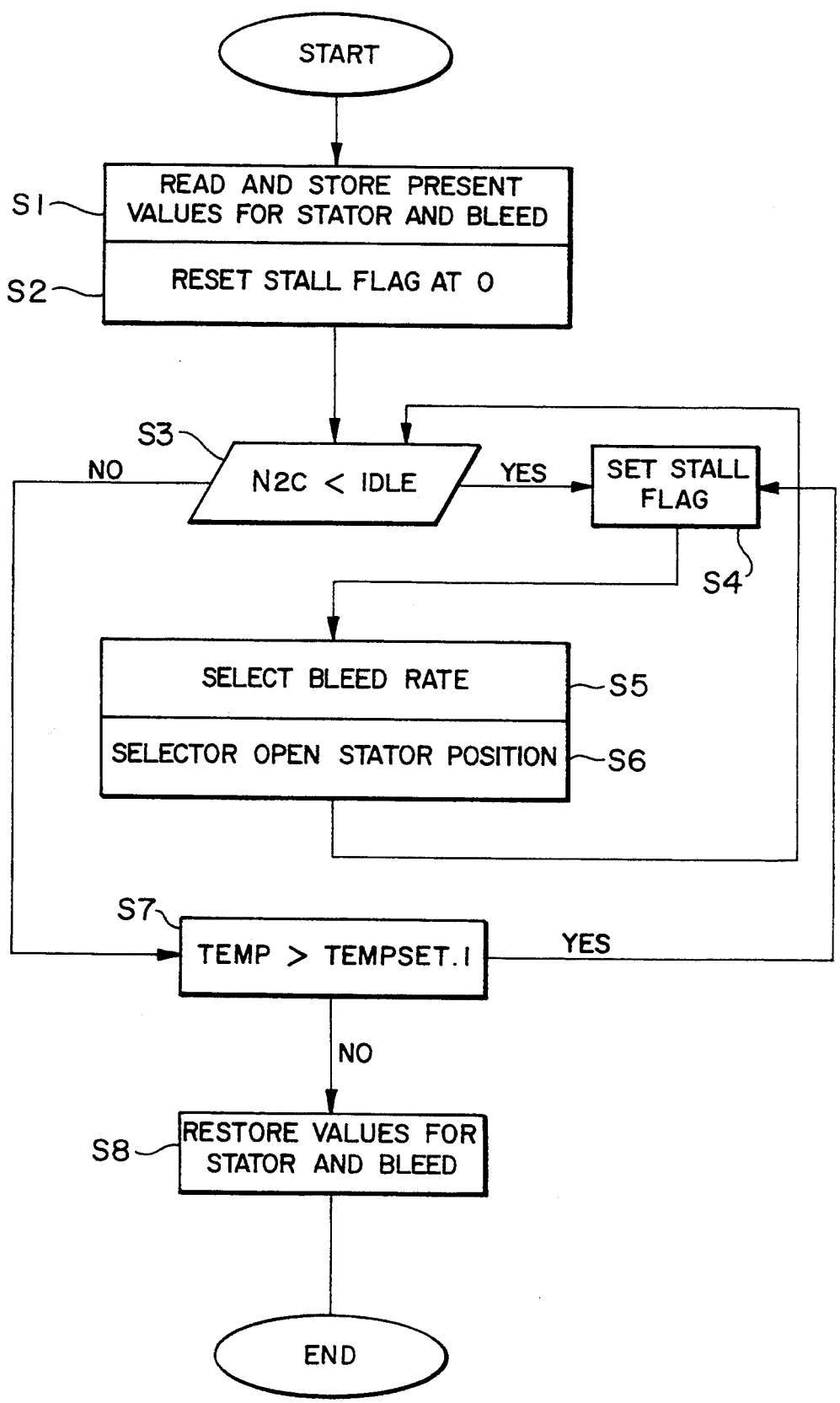

ROTATING STALL RECOVERY

TECHNICAL FIELD

This invention relates to gas turbine engines, in particular, aircraft gas turbine engines and techniques for providing superior rotating stall recovery.

BACKGROUND OF THE INVENTION

In a gas turbine engine, in particular, an aircraft gas turbine engine, compressor stalls must be avoided as much as possible. There are different types or degrees of compressor stalls. One, a full span, non-recoverable, rotating stall, brings about a major loss in thrust because a large section of the compressor simply stops pumping—to the point that the compressor cannot return to normal operation, requiring a complete engine shutdown and restart. Less serious compressor stalls appear as partial span rotating stalls near the blade tips. However, these partial span rotating stalls can lead to the undesirable compressor "surge" phenomenon, in which the complete flow transiently reverses followed by a recovery to nearly normal operation. The flow reversal and subsequent recovery "attempt" may repeat for several cycles. A compressor with good recoverability characteristics will automatically return to normal operation after very few surge cycles. The momentary thrust loss, for a portion of a second during surge and recovery, can have minimal impact on aircraft performance; even so, surge is best avoided because it can cause structural damage to vital engine components. Also, surge can sometimes transition into the highly dangerous mode of non-recoverable full span rotating stall, which results in very low thrust as well as turbine damage, mainly from overheating.

U.S. Pat. Nos. 5,165,844 and 5,165,845 and companion patent application titled SUB-IDLE STABILITY ENHANCEMENT AND ROTATING STALL RECOVERY, Ser. No. 07/859,767, filed on Mar. 30, 1992, all assigned to United Technologies Corporation, the assignee of this application, consider techniques for preventing and recovering from full span stalls. So called "full span" rotating stalls are associated with a deficiency in the engine's systems recoverability characteristics. In that regard, investigations have shown that engine recoverability is dependent on many factors including compressor design parameters, engine components, volumes, combustion stability and engine cycle.

Mass flow through the compressor stage is a function of several factors. In a full-span rotating stall, mass flow can be so small that the resulting high fuel air ratios cause internal engine temperature elevations to potentially destructive levels. If allowed to continue, this hung stall condition can lead to serious engine damage. When the compressor is in a hung stall, the pilot must shut down the engine and then try to restart it, something that is not easy to do, especially quickly.

DISCLOSURE OF THE INVENTION

An object of the present invention is to provide and efficient, automatic way to rapidly correct a gas turbine stall.

According to the invention, the conditions associated with a stall condition are sensed by a signal processor based control system that controls compressor bleed and stator deflection to augment the response characteristics between compressor pressure and airflow for a corrected turbine speed, a process that produces a shallow slope in the relationship between compressor speed (WC) and pressure (i.e. pressure ratio PR) so that less pressure change is needed to force the compressor into a stall recovery mode of operation.

According to one aspect of the invention, the augmentation takes place in response to compressor temperature elevations or inadequate compressor speed.

According to another aspect of the invention, once the stall condition ceases (the compressor recovers from the stall), stator deflection and bleed are returned to pre-stall levels, which are stored by the signal processor Among the features of the present invention, it provides a reliable stall recovery technique that is particularly suitable for "DEECS" (digital electronic engine control systems), which increasingly are in wider use to control engine operation electronically in response to a plurality of signals manifesting instantaneous engine operating characteristics.

Other aspects, features and benefits of the invention will be apparent to one skilled in the art from the drawing and the description of the invention that follow.

BRIEF DESCRIPTION OF THE DRAWINGS

FIG. 1 is a functional block diagram showing a gas turbine engine and an electronic engine control for utilizing the present invention in conjunction with a stator control.

FIG. 2 is an enlarged view of a conventional stator system.

FIG. 4 is an enlargement of a portion of FIG. 3 showing the slope between PB/25 and WC in the prior art and when the present invention is utilized.

FIG. 5 is flow chart of signal processing sequences for carrying out the invention with a signal processor.

BEST MODE FOR CARRYING OUT THE INVENTION

Figure 3:
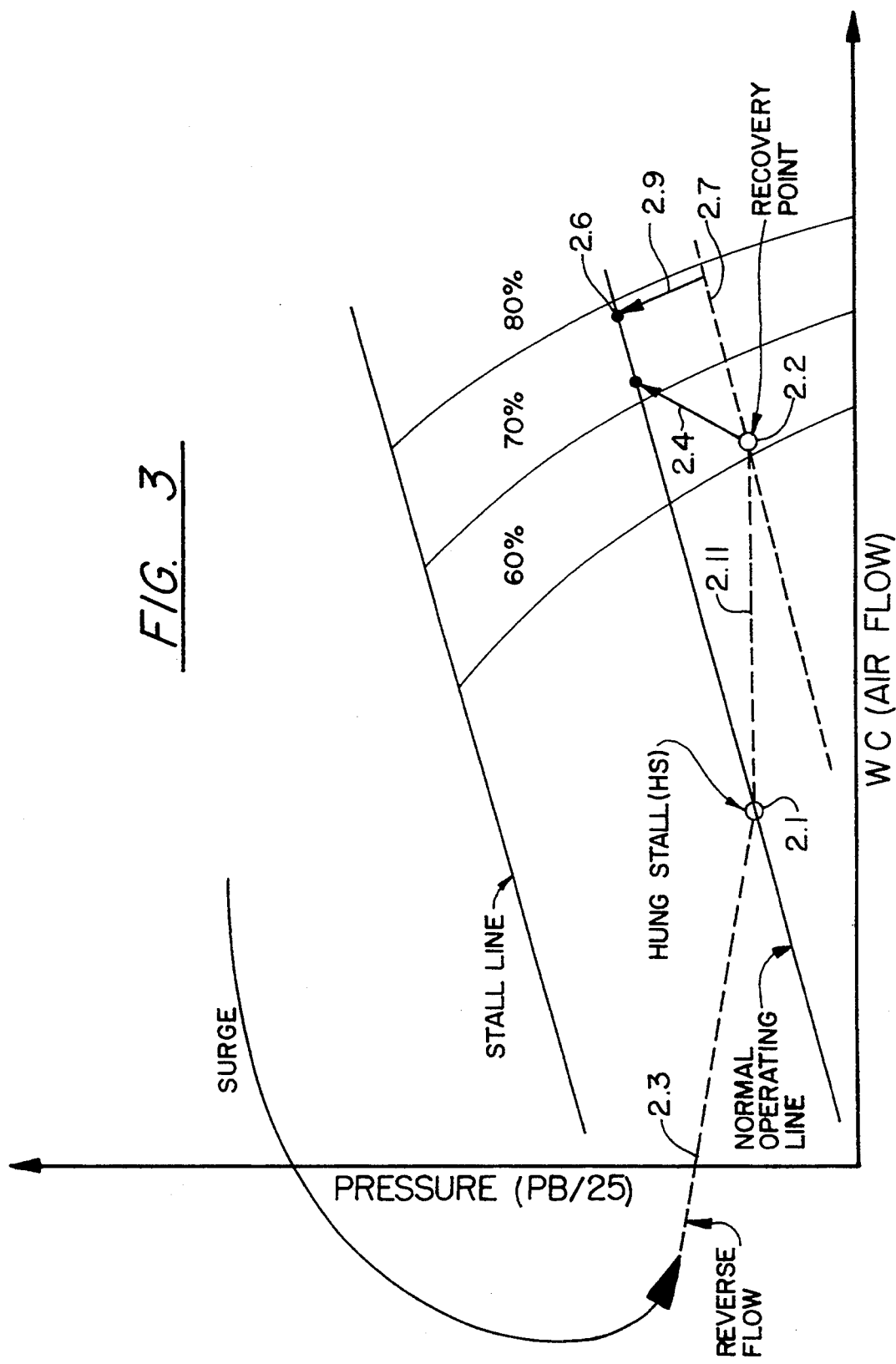
FIG. 3 is a graph of compressor ratio (PB/P25) as a function of airflow (WC).

In FIG. 1, a gas turbine engine 10 has a compressor case 9 containing a compressor section 11 that includes a plurality of compressor stages each having a compressor disk 11.2 and a plurality of compressor blades 11.3 on the disk rim. As noted in the aforementioned application and patents, thermal relationships between the case and the disk, rim and blades have contributing effects on the compressor's stall characteristics.

A stator 12 (not shown in detail in FIG. 1), is shown in the enlargement in FIG. 2 and noted with the boundary 2—2 in FIG. 1. The stator has moveable vanes 12 that can be individually moved by respective mechanical controls A and B to adjust air flow to the compressor blades 11.3, varying the angle of attack to the blades and thereby blade lift. U.S. Pat. No. 4,995,786 shows similar stator vanes under reference numeral 24. There, the movement of the blades 24 is provided by a control arm 48, which, it should be understood, corresponds functionally to the controls A and B shown in this in FIGS. 1 and 2. For present purposes, it is sufficient to understand that the deflection of the vanes is varied by a stator position (deflection) control 13 in FIG. 1 in response to a signal CVV, supplied on a line 13.1, with a variable magnitude that determines "vane deflection".

Also shown in FIG. 1, a controller 14, having a central signal processing unit CPU 14.3 and an input/output stage 14.2, receives a power control signal over a line 16.1 from a thrust control lever 16 and controls fuel flow between the fuel input 15 and fuel output lines 17 to the engine to control engine thrust. A compressor bleed control 17, which is known in the art, has an input 17.1 to the compressor. The control is, according to the invention, connected to the controller 14 by a signal line 17.2 that is connected to the input/output section 14.3, which also receives various engine operating signals manifesting engine conditions, besides sending a signal BCT to the bleed control over the line 17.2 to control the bleed rate. For simplicity certain known aspects of a microprocessor based control have not been shown, the reason being that the application of a computer control to a gas turbine engine control is rudimentary in light of the prior, such as the aforementioned patents. For instance, the CPU is assumed to have the capability of storing and retrieving (addressing) data from both a random access memory (RAM) and a programmed memory (EPROM), either being represented under reference number 14.4. The stator control, as noted before, is connected to the controller 14, which produces the signal CVV that controls the deflection of the vanes 12 and thereby the angle of attack of between incoming airflow and the blades 12.

A turbine temperature sensor 19 provides a signal TEMP to the controller 14 over a signal input line 14.5. The signal TEMP represents (manifests) compressor temperature (e.g. compressor discharge temperature), an operating condition that changes (as explained below) with the onset of a stall. The control also receives other signals showing the engine's operating condition, such as fan speed N1 from a sensor 21 on input line 20.1, compressor speed N2, on input line 22.2 from a sensor 22, and compressor pressure PB on input line 14.7. N1 and N2 are "corrected" using traditional signal processing (e.g. look-up tables) accessing known but stored (in computer memory) correction tables. As described in more detail below the control 12 processes these signals to determine if a stall condition exists based on N2 (corrected, i.e. N2C) and temperature (TEMP). Depending on the sequence of the changes in those signals, particularly relative to compressor speed WC, the control 12 preferably dictates (commands) adjustments in both stator deflection and compressor air bleed by providing appropriate control signals to their respective controls 13 and 17.

Referring to the graph forming FIG. 3 may be helpful in appreciating the effect of the invention. The graph shows the relationship between compressor pressure PB and compressor airflow (WC) conditions when the compressor recovers from a hung stall condition, at position 2.1. Dashed line 2.3 is included to illustrate the phenomena by which the airflow can actually reverse as the compressor surges before entering a hung stall condition, a condition that can happen several times before a full compressor stall recovery (point or location 2.2), with the compressor operation following the path of line 2.11 to path 2.4 to return to a normal operating line along line 2.6. In FIG. 4, line 2.11, the traditional stall recovery path is again shown, as it is in FIG. 3; however, an additional stall recovery line is shown: the path, line 2.21, produced when the present invention is deployed. Both lines pass through hung stall location 2.1, but the difference in the slopes between line 2.11 and 2.21 should be observed because the shallow slope of line 2.21 (caused by opening the stator vanes) means that less change in compressor inlet pressure PB is needed to increase WC to point 2.22 to bring about a stall recovery, as compared to point 2.2 in FIG. 3. This characteristic brought about with the present invention, which accelerates stall recovery by making it easier, in effect, for a small pressure change to nudge the compressor in the direction of the recovery point 2.22 in FIG. 4; point 2.2 in FIG. 3). Furthermore, the actual engine operating line is shifted to line 2.9 with the invention, increasing the effective downstream throttle area, providing addition pressure bias to nudge the compressor from the stall.

The processor 14 may be a microcomputer or a dedicated processor, such as a state machine or a similar device, but in any case a device capable of rapidly determining specific engine operating points from the various engine input signals and producing proper control signals for the stator control 13 (to control the deflection of the vanes 12) and for the bleed control 15. Referring to FIG. 5, a signal processing sequence to carry out the present invention may be incorporated as test and control sequences in an overall engine management and control program using the signal processor 14 as the signal input, storage and signal generation engine. The first step in the sequence S1 reads and stores the current values for stator deflection and compressor bleed. The next step S2 resets the stall condition flag to zero. At step S3, a test is made to determine, based on N2C, if the engine is below idle speed (a minimum speed level). An affirmative answer or test result (YES) leads to step S4, where the stall flag is set, meaning that a stall has been detected. At step S5, a bleed rate is selected from a stored value, leading to step S6, where a selected stator deflection, in the open direction, is retrieved from a stored value. Both the bleed rate and deflection values may be calculated "on the fly", of course, using known computer based techniques, such as those outline previously. In any case, bleed is increased and stator opening is increased at this stage. From step S6, the test at step S3 is again made, effectively defining a do until sequence that continues until a negative answer (NO) is produced at step S3, leading to a test at step S7, where compressor temperature is tested. If the temperature (TEMP) is more that a preset value (TEMPSET. 1), an affirmative answer is produced causing the stall flag to be set and then accessing the stored bleed and stator deflections values using steps S5 and S6 to increase bleed and stator opening. If TEMP is not greater than TEMPSET. 1, the stator and bleed values are restored to their pre-stall values at step S8 (to the values stored at step S1) to the values stored at step S1, ending the sequence ends.

The foregoing is a description of the best mode for carrying out the invention; however, various modifications and alterations may be made in whole or in part by one skilled in the art without embracing the true scope and spirit of the invention. For instance, temperature has been shown as the preferred way to initiate the stator and bleed augmentation to change the engine stall recovery characteristics upon determination of a stall. Other engine operating parameters showing unique qualities indicative of a stall condition may be used in conjunction with or in place of temperature, such as compressor pressure ratio versus corrected speed.

We claim:

1. A gas turbine engine comprising a stator control, a compressor bleed control and a signal processor receiving signals indicating compressor temperature and pressure and indicating compressor speed, characterized in that the signal processor comprises:

means for sensing that a compressor has entered a hung stall and for controlling, during the hung stall condition the stator control and the bleed control to modify the relationship between compressor airflow and compressor outlet pressure to increase the magnitude of the change in compressor airflow produced for a change in compressor outlet pressure, said means operating until the hung stall condition ceases.

2. A gas turbine engine according to claim 1, further characterized in that the signal processor comprises:

means for sensing responsive to compressor speed being below a selected level or compressor temperature being above a selected level.

3. A gas turbine engine according to claim 2 further characterized in that the signal processor comprises:

means for dictating a selected stator increased opening deflection and a selected increased bleed rate in response a first condition at which compressor speed is below a selected value.

4. A gas turbine engine according to claim 3 further characterized in that the signal processor comprises:

means for dictating selected stator increased opening deflection and a selected increased bleed rate in response to a second condition at which compressor temperature exceeds a selected value.

5. A gas turbine engine according to claim 4 further characterized in that the signal processor comprises:

means for restoring a stator deflection and bleed rate to stored levels stored before said selected stator increased opening deflection and said selected increased bleed rate are dictated, said means being responsive to the cessation of said first condition and said second condition.

6. A gas turbine engine according to claim 3, further characterized in that the signal processing means comprises:

means for restoring a stator deflection and bleed rate to stored levels stored before said selected stator increased opening deflection and said selected increased bleed rate are dictated, said means being responsive to the cessation of said first condition.

* * * * *